March 12, 1968  R. G. HINDMAN ET AL  3,372,410
FLARE FOR USE IN A BODY OF WATER
Filed July 11, 1966  3 Sheets-Sheet 1

INVENTORS.
ROBERT G. HINDMAN,
WILLIAM J. RUEZ, III,
BY
ATTORNEY.

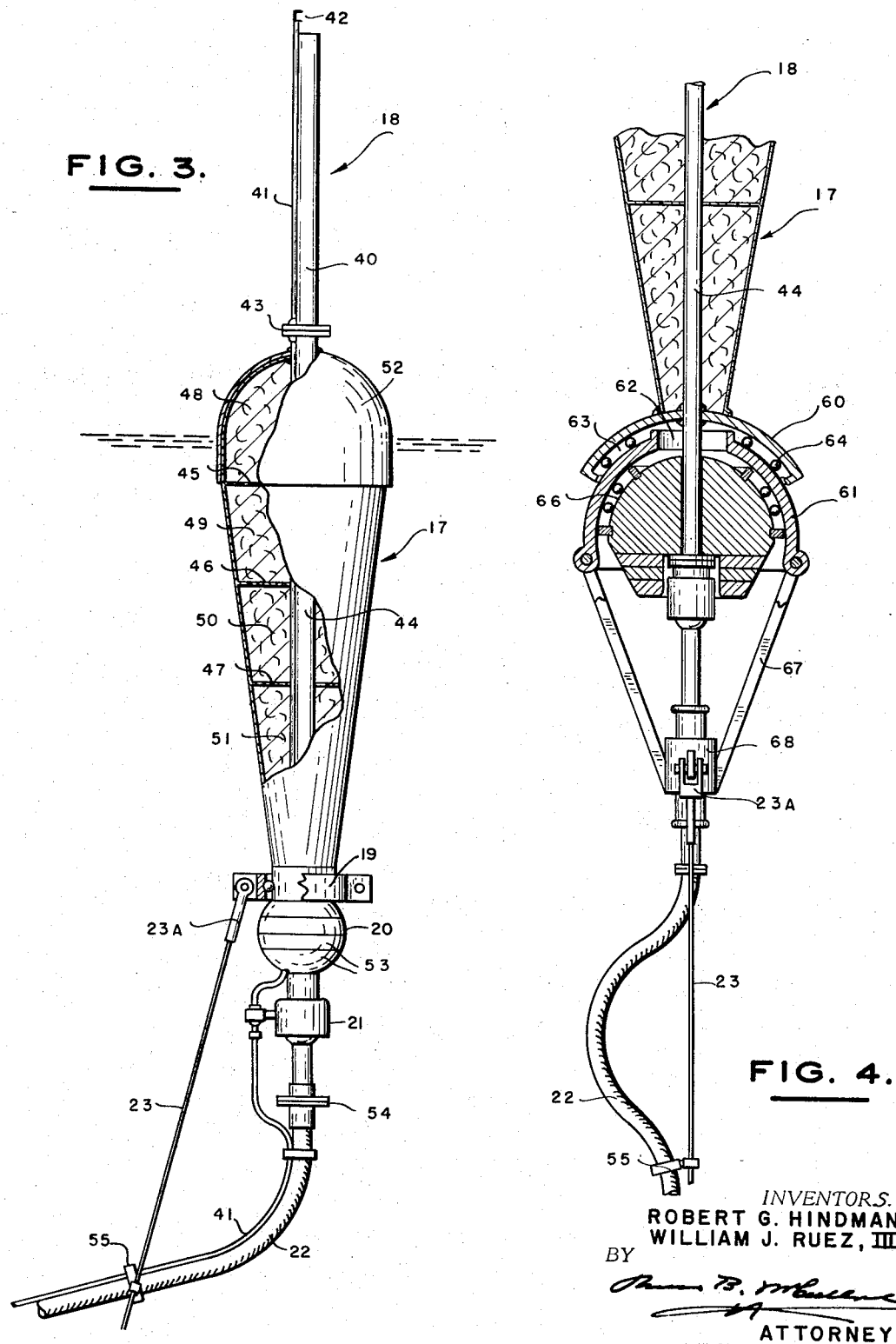

March 12, 1968     R. G. HINDMAN ET AL     3,372,410
FLARE FOR USE IN A BODY OF WATER
Filed July 11, 1966     3 Sheets-Sheet 3
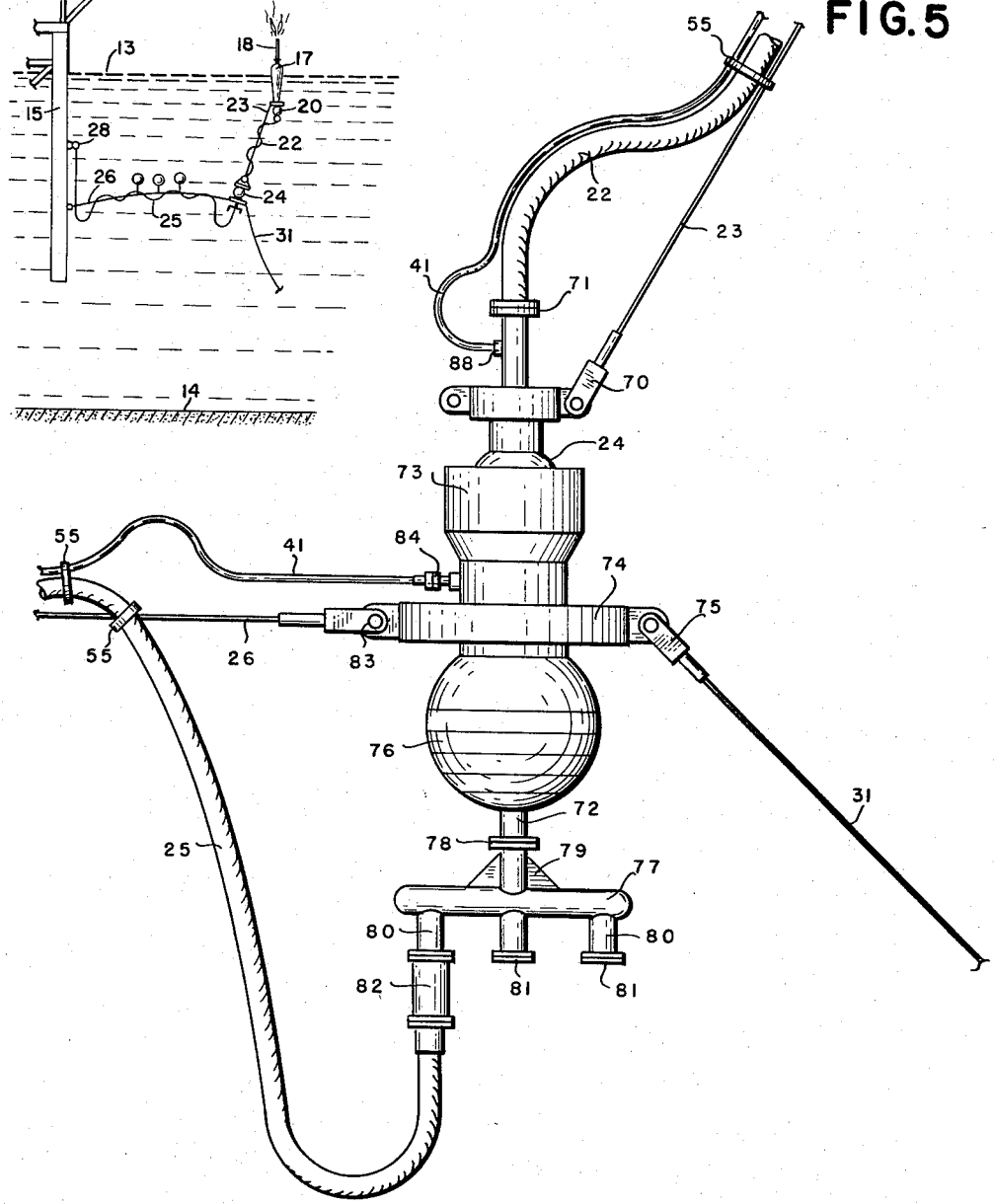
INVENTORS.
ROBERT G. HINDMAN,
WILLIAM J. RUEZ, III,
BY
ATTORNEY.

United States Patent Office 3,372,410
Patented Mar. 12, 1968

3,372,410
FLARE FOR USE IN A BODY OF WATER
Robert G. Hindman, New Orleans, and William J. Ruez III, Metairie, La., assignors to Esso Production Research Company
Filed July 11, 1966, Ser. No. 564,173
10 Claims. (Cl. 9—8.3)

ABSTRACT OF THE DISCLOSURE

A floating flare is flexibly interconnected with a platform in a body of water such that the flare is maintained a selected distance from the platform by means of several swivel or ball joints providing universal relative motion.

---

Figure 1:
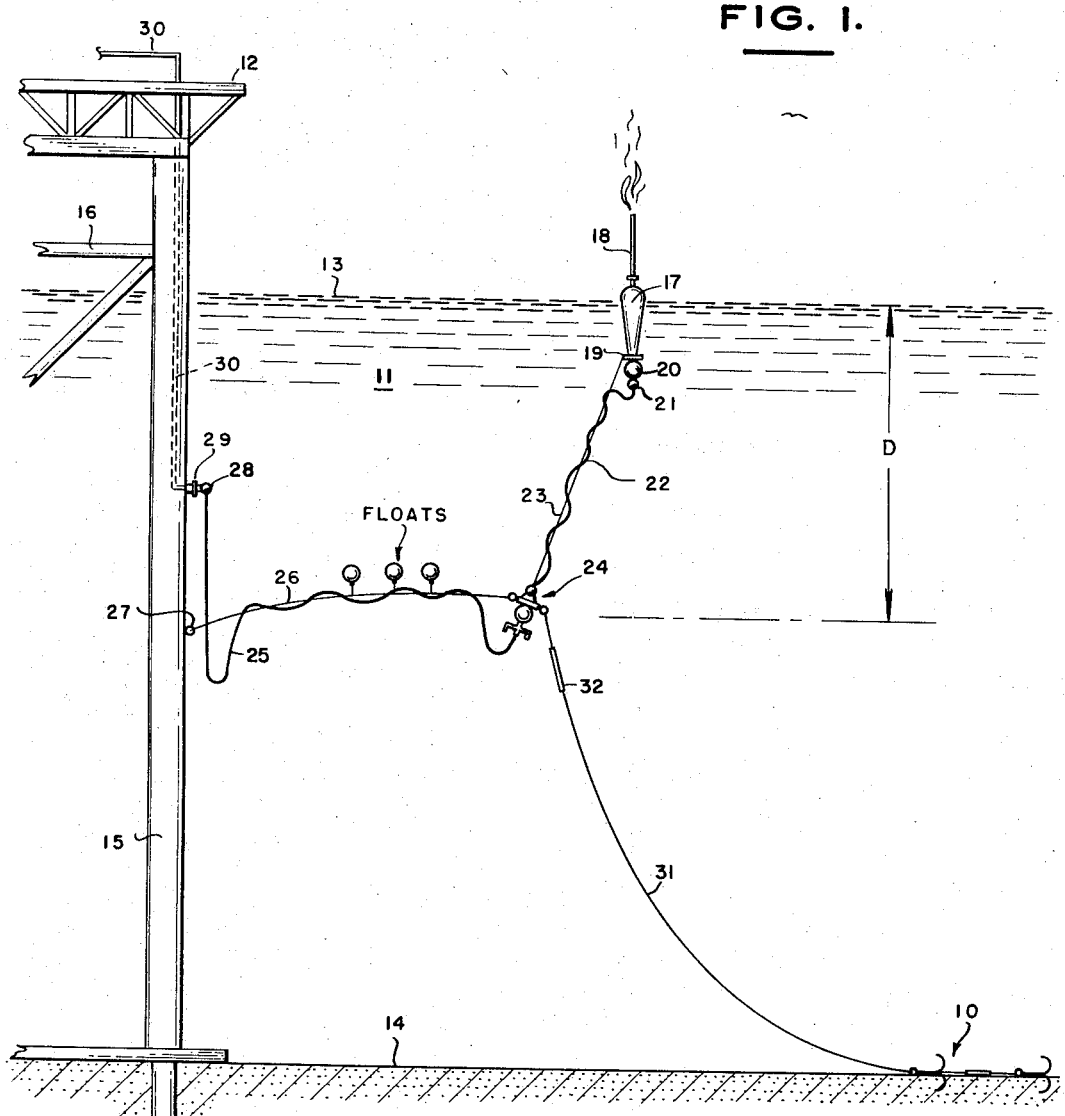

The present invention is directed to a flare for use in a body of water. More particularly, the invention is concerned with a flare for use in a body of deep water a safe distance from a platform. In its more specific aspects, the invention is concerned with a flare stack for disposal of fluid, gas or gas and liquid in combination, and to relieve pressure during hydrocarbon production operations in a body of water.

The present invention may be briefly described as a flare for use in a body of water in conjunction with a platform in which a float provided with a flare means adapted to be located a selected distance from the platform is arranged in the body of water a safe distance from the platform; first means fluidly interconnecting the float and flare means with a first conduit means provides rotation of the float and flare means relative to the first interconnecting means. A second means interconnects the first fluid conduit with a second fluid conduit means providing rotation of the first fluid conduit means relative to the second interconnecting means. A connection means is attached to the second interconnecting means, and the float and flare means are rotationally anchored at the selected distance. A third means fluidly interconnects the second fluid conduit means with the platform providing rotation of the second fluid conduit means relative to the platform.

The flare is suitably provided with means for igniting gas released to the flare means, and this means may suitably be an ignition means provided with means for providing fuel to the ignition means. The ignition means may include a battery or wind or current driven generator for electric spark plug ignition. Such means are available on the market.

The first, second and third interconnecting means may suitably comprise swivel joints or a ball joint, or any means which has universal relative motion.

The present invention encompasses means for supportingly connecting the first fluid conduit means to the float and flare means and the second interconnecting means, and the second fluid conduit means is supportingly connected to the second interconnecting means and to the platform with the second conduit means being floatingly maintained a selected distance below water level. The supporting connection may suitably be a hawser line between the several means, and the second fluid conduit means may be floatingly maintained at the selected distance by floatation means such as floats or other buoyancy providing means connected to the hawser lines and the like. For example, the hawser may be provided with buoyancy means, be made of buoyant material, or have buoyancy means built into it.

The connection means connecting the second interconnecting means for rotationally anchoring the float and flare means may suitably be an anchor cable attached permanently or releasingly to water bottom. The anchor cable may suitably be a polypropylene hawser having a spring means embodied therein. The spring means may be a plurality of hawser bights of the polypropylene, or may be other spring means. Polypropylene has a density less than 1.0. Hence, it in itself is buoyant and may be used in construction of the several hawsers. The connecting means may suitably be a flexible tubular member attached to water bottom, or may be any other member which has at least limited flexibility.

The float is suitably constructed in a conical shape which forms a conical shaped body member which is provided with counterweights to allow the body member to float upright with the apex in a downwardly pointing position. The body member may suitably be reinforced with bulkheads dividing the body member into compartments. The body member may contain a buoyant material such as a urethane foam or other light buoyant material. The body member may be free of any material and require only air for its buoyancy.

The platform may be fixed relative to water bottom such that it is supported by piling and the like extending from water bottom to above the water surface. Similarly, the platform may be a floating platform which may have limited movement relative to water bottom, or it may be movable relative to water bottom.

The float may be provided with means for shielding it from heat released from the flare means. This shielding means may suitably be a ceramic shield or cover or other well-known means for shielding an element against heat.

A problem exists in deep water oil and gas production facilities in that it is necessary from time to time to release fluid, gas or gas that may contain substantial quantities of liquid, from the system. Release of fluid from the system is dangerous, and it is desirable that this fluid be burned; hence, facilities for burning this released fluid a safe distance from an offshore platform are necessary. Provision is then made for releasing this fluid through a suitable flare stack a safe distance from the platform. Heretofore, such flare stacks have been expensive, hazardous, or have posed other problems which the present invention overcomes.

The present invention, therefore, is quite important and useful.

Figure 2:
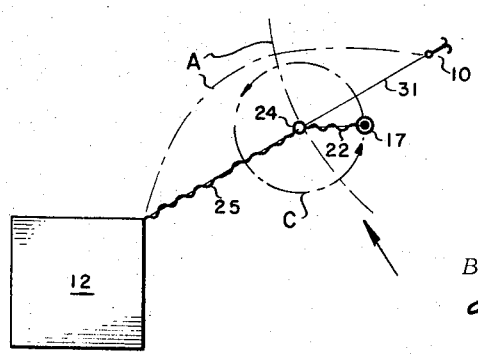

The invention will be further described and illustrated by reference to the drawing in which:

FIG. 1 is an elevation view of the present invention;
FIG. 2 is a small schematic plan view of the present invention;
FIG. 3 is a detailed view in partial section of a float and flare means in accordance with the present invention;
FIG. 4 is a modification of the embodiment of FIG. 3;
FIG. 5 illustrates in partial section a connection means of the present invention; and
FIG. 6 illustrates the platform of FIG. 1 in floating condition.

Referring now to the drawing in which identical numerals identify identical parts and in which a best mode and embodiment are described, numeral 11 designates a body of water in which a platform 12 above water level 13 is supported on water bottom 14 by piling 15. Piling 15 is suitably cross-braced by crossbracing 16, which extends to other pilings (not shown).

Production facilities (not shown) are provided on platform 12, and it is desirable to provide facilities for burning gas a safe distance from the platform 12. To this end, a float 17 provided with flare means 18 is arranged a selected distance from the platform 12. The float 17 is provided with a swivel means 19 and a counterweight 20. The swivel means 19 includes a ball joint 21 to which is connected a flexible hose member 22. Flexible hose member 22 is supportingly connected to a hawser 23, and the hawser 23 and the hose 22 are connected to a second ball joint 24. Connected to the second ball joint 24 is a hose member 25 which is supportingly connected to a hawser 26. The hawser 26 is connected by a pin or other means 27 to piling 15, while the hose 25 is connected to the piling 15 by a ball joint 28 and by means of a flange connection 29 to a line 30 leading to platform 12 and to storage facilities or other production facilities thereon. The pin or other means 27 suitably includes a frangible connection or shear pin with the platform 12 which may suitably be designed to rupture or break if excessive forces are exerted on the platform 12 by the device of the present invention which would allow release during violent wind and wave action. The second ball joint 24 is connected by connection means 31 provided with a spring 32 to anchor means 14, which suitably is a plurality of anchors. Other anchors such as piling driven in water bottom 14 or other means in water bottom 14 may be used. The spring means 32 may be a plurality of hawser bights such as polypropylene. In fact, the anchor cable 31 may be constructed of polypropylene to provide buoyancy to the anchor cable 31.

The ball joint 24 is suitably located a distance D from water surface 13. This distance D is below the zone of large wave forces and the hazards to navigation but above the maximum diver danger limit. In other words, the ball joint 24 is located a sufficient distance from water surface 13 to avoid violent wave action and interference with shipping but yet allow servicing by divers if required. This water depth may suitably be 150 to 200 feet.

Referring now to FIG. 2, it will be seen that the hose 25 is attached to the platform 12 and to hose 22 through ball joint 24 while the ball joint 24 is connected to the anchor 14 by cable 31. The circle C in FIG. 2 describes the motion of float 17 about the anchorage axis while the arc A describes the movement about the anchorage 14. Of course, in FIG. 2 the movement A and the circle C apply only for forces in the direction shown by the arrow.

Referring now to FIG. 3, the flare means 18 includes a flare line 40 provided with a pilot light line 41 which in turn is provided with an electric pilot ignition means 42. A flange member 43 connects the flare line 18 to the conduit 44 running through the float 17, which is provided with a plurality of perforated metal bulkheads 45, 46 and 47. The bulkheads 45, 46 and 47 define with the float 17 a plurality of compartments 48, 49, 50 and 51, which suitably may be filled with a buoyant material such as urethane or other foams or simply may be empty of solid material and may contain a gas such as air. The upper end of the float 17 is provided with a ceramic heat shield 52 which is designed to reflect heat from the flame above the tip of flare means 18.

The lower end of the float 17 terminates in sectional counterweights 53 of heavy metal such as iron, lead, and the like, which comprises the counterweight 20 and which may include zinc for cathodic protection. A swivel ring 19 is arranged on the lower end of the float 17 and allows for relative movement of the float 17. Attached to the swivel ring 19 is a hawwser 23 by a clevis 23A. The conduit 44 terminates in ball joint 21 to which the hose 22 is connected by flange 54. The hose 22 is connected to hawser 23 by suitable clamps 55.

A modification of FIG. 3 is shown in FIG. 4 where the float 17 is provided with a stop ring 60 on its lower end through which the conduit 44 extends. Below the stop ring 60 is a swivel and ball ring 61 having an opening 62 through which the conduit 44 extends. The swivel and ball ring 61 is provided with bearing races 63 in which bearings 64 are arranged. A suitable space 65 between the swivel and ball ring 62 and counterweight and ball surface 66 is also provided. The counterweight and ball surface 66 may be segmented to allow increasing or decreasing the counterweight on float 17. A yoke 67 forms the lower end of swivel and ball ring 61 and is suitably attached to a collar 68. The hose 22 passes through the collar 68, and then is attached to ball joint 21A which is attached to conduit 44 and hose 22 with appropriate flanges. The collar 68 is attached by means of clevis 69 to hawser 23. The hose 22 is connected to the hawser 23 by clamp 55.

Referring now to FIG. 5, the hawser 23 connects by clevis 70 to ball joint 24, and the hose 22 connects through flange 71 to ball joint 24 and its housing 73. The ball joint housing 73 is provided with an anchor ring 74 to which the anchor cable 31 is attached by clevis 75. The anchor ring 74 is provided with counterweight 76 which is suitably segmented and may be provided with sections of zinc for cathodic protection against corrosion.

A conduit 72 which originates in ball joint housing 73 suitably terminates in a header ring 77 connected thereto by flange 78. The conduit 72 and the header ring are strengthened by gusset 79. Header ring 77 is provided with a plurality of conduit connections 80 equipped with blind flanges 81 to which additional platform flare lines may be attached. One of the conduit connections 80 is connected by means of a check valve 82 to hose 25 which in turn is connected by ball joint 28 (see FIG. 1) to the platform, as has been described. The hawser 26 connects by clevis 83 to anchor ring 74.

The pilot line 41 may suitably be attached by clamps 55 to the hose 22, as shown in the drawing. Pilot line 41A connects into housing 73 through a union 84. Line 41 is swivel mounted in housing 73 and passes through ball joint 24 and out by way of connection 88. Line 41 then clamps to hose 22 and extends on to flare pipe 18.

With reference to FIG. 6, it will be seen that piling or support 15 terminates above water bottom 14 and the platform 12 is in floating condition. Means for providing buoyancy for floating platforms are well known and need not be described further herein.

The present invention is quite important and useful in that the particular cone shape and the counterweighting of the float provide for stability. The heat shield on the float allows dissipation of heat from the flame, and the float swivel arrangement is provided for anchorage and attachment of hose on the same ball joint which results in reduction of torsional stresses on the hose. The anchor swivel also provides vertical stability for the stack. By providing an ignition means and pilot line for gas, relighting of the flare stack is not a problem and can be done remotely from the platform.

Likewise, the use of zinc anodes provides for weighting of the float and also provides cathodic protection.

Supporting the hoses by hawsers or cables reduces stresses. Likewise, supporting the cable below water level at safe depths protects the cables from undue wind and wave induced stresses.

Means are also provided for multiple flare lines to the same float and flare means, and the float is free to swing about a single central anchor which absorbs less total kinetic energy from a given wave form than a plurality of anchoring means and thus absorbs less energy in the form of force. By providing a portion of the flare line underwater and supporting it at practical diver working level, the flare line may be serviced, such as repaired or replaced. Likewise, by having the float at the water surface, the components of the present invention may be easily retrieved and repaired at water surface as desired.

Rotation of the flare line about the anchorage to the platform is provided without overstressing the hose in the event the anchorage means should break or drag. Likewise, the springs and the cable and the use of low density hawsers, such as polypropylene, reduce anchorage wear as well as providing buoyancy to the several hawsers. Means may be provided for breakage of one or more anchors as required at given force levels to keep the load off the platform and to improve chances of hurricane survival of the present invention during violent wind storms and hurricanes. The invention is therefore quite useful and important.

The nature and objects of the present invention having been fully described and illustrated, and the best mode and embodiment contemplated set forth, what we wish to claim as new and useful and secure by Letters Patent is:

1. A flare for use in a body of water a safe distance from a platform which comprises in combination:
   a float provided with flare means adapted to be located a selected distance from said platform;
   first means fluidly interconnecting said float and flare means with first conduit means providing rotation of said float and flare means relative to said first interconnecting means;
   second means interconnecting said first fluid conduit means with second fluid conduit means providing rotation of said first fluid conduit means relative to said second interconnecting means;
   connection means attached to said second interconnecting means for rotationally anchoring said float and flare means at said selected distance; and
   third means fluidly interconnecting said second fluid conduit means with said platform providing rotation of said second fluid conduit means relative to said platform.

2. A flare in accordance with claim 1 in which the flare means is provided with means for igniting a fluid.

3. A flare in accordance with claim 1 in which the first, second and third interconnecting means comprise swivel joints.

4. A flare in accordance with claim 1 in which the first fluid conduit means is supportingly connected to said float and flare means and to said second interconnection means, and said second fluid conduit means is supportingly connected to said second interconnection means and to said platform, and said second conduit means is floatingly maintained a selected distance below water level.

5. A flare in accordance with claim 1 in which the connection means is an anchor cable anchored to water bottom.

6. A flare in accordance with claim 1 in which the float is a buoyant counterweighted conical body member adapted to float with the apex of the body member normally in a downwardly pointing position.

7. A flare in accordance with claim 1 in which the platform is fixed relative to water bottom.

8. A flare in accordance with claim 1 in which the platform is a floating platform.

9. A flare in accordance with claim 1 in which the connection means is a flexible member.

10. A flare in accordance with claim 1 in which the float is provided with means for shielding it from heat released from said flare means.

References Cited
UNITED STATES PATENTS

| | | | |
|---|---|---|---|
| 2,837,753 | 6/1958 | Lewis | 9—8.3 |
| 2,894,269 | 7/1959 | Dodge | 9—8.3 |
| 2,969,552 | 1/1961 | Karnow | 9—8.3 |

MILTON BUCHLER, *Primary Examiner.*

T. MAJOR, *Assistant Examiner.*